United States Patent
Mendez Viera

(10) Patent No.: US 12,548,029 B2
(45) Date of Patent: Feb. 10, 2026

(54) BLOCKCHAIN BASED ARTIFICIAL INTELLIGENCE RISK DETECTION AND INTERVENTION SYSTEMS AND METHODS

(71) Applicant: Janelle Marina Mendez Viera, Albany, NY (US)

(72) Inventor: Janelle Marina Mendez Viera, Albany, NY (US)

( * ) Notice: Subject to any disclaimer, the term of this patent is extended or adjusted under 35 U.S.C. 154(b) by 0 days.

(21) Appl. No.: 18/220,234

(22) Filed: Jul. 10, 2023

(65) Prior Publication Data

US 2024/0289802 A1 Aug. 29, 2024

Related U.S. Application Data

(60) Provisional application No. 63/486,977, filed on Feb. 25, 2023.

(51) Int. Cl.
*G06Q 20/40* (2012.01)
*G06Q 20/02* (2012.01)

(52) U.S. Cl.
CPC ......... *G06Q 20/4016* (2013.01); *G06Q 20/02* (2013.01); *G06Q 20/40145* (2013.01); *G06Q 2220/00* (2013.01)

(58) Field of Classification Search
CPC ............... G06Q 20/4016; G06Q 20/02; G06Q 20/40145; G06Q 2220/00
See application file for complete search history.

(56) References Cited

U.S. PATENT DOCUMENTS

| | | | | |
|---|---|---|---|---|
| 11,625,723 | B2 * | 4/2023 | Pandian | G06N 3/0499 |
| | | | | 705/39 |
| 2022/0172207 | A1 * | 6/2022 | Cella | G06N 3/065 |
| 2022/0198562 | A1 * | 6/2022 | Cella | G06Q 40/04 |
| 2022/0414670 | A1 * | 12/2022 | Shannon, III | G06Q 20/4016 |
| 2023/0134651 | A1 * | 5/2023 | Agbamu | G06V 40/172 |
| | | | | 705/325 |
| 2023/0206233 | A1 * | 6/2023 | Aument | G06Q 20/4016 |
| | | | | 705/44 |

FOREIGN PATENT DOCUMENTS

CA 3177388 A1 * 1/2022 ............ G06F 21/00

* cited by examiner

*Primary Examiner* — Peter D Nolan
*Assistant Examiner* — Matthew Cobb
(74) *Attorney, Agent, or Firm* — Outlier Patent Attorneys, PLLC

(57) ABSTRACT

Disclosed herein are methods and systems related to fraud detection, risk assessment, and intervention. More specifically, this is related to conducting and monitoring transactions on a blockchain through the use of artificial intelligence, AI, and machine learning. This combination can be applied to financial systems to create an Artificial Intelligence Financial Technology Blockchain, AIFTB. The AIFTB is able to receive a variety of data and use it to predict actions being taken by users and detect if there are any risks or legal concerns with the activity. The AIFTB is then able to apply its training to execute smart contracts on the blockchain based on the risk and legality of the data it received. Finally it will alert appropriate authorities based on the predictions.

19 Claims, 7 Drawing Sheets

BLOCKCHAIN BASED ARTIFICIAL INTELLIGENCE RISK DETECTION AND INTERVENTION SYSTEMS AND METHODS

CROSS-REFERENCE TO RELATED APPLICATIONS

This application claims the benefit of, and priority to, U.S. Provisional Patent Application No.: 63/486,977 filed Feb. 25, 2023, titled "ARTIFICIAL INTELLIGENCE FINANCIAL TECHNOLOGY BLOCKCHAIN (AIFTB) FOR THE U.S. LIBERTY COIN (USLC)." This application is herein incorporated by reference in its entirety herein.

BACKGROUND

Field of Art

This invention is related to fraud detection, risk assessment, and intervention systems and methods.

Background

The advent of the internet, mobile technologies, and the general digitization of business and financial operations have transformed how transactions are conducted worldwide. This transformation has brought an unprecedented convenience, speed, and efficiency to transactions, but it has also given rise to new types and higher incidences of fraudulent activities.

Existing fraud detection technologies typically employ rule-based systems, statistical analysis, and machine learning algorithms to identify anomalies or irregularities in transaction patterns. However, they suffer from several critical limitations that have rendered them increasingly inadequate in the face of evolving fraud strategies.

Firstly, rule-based systems require predefined rules and conditions to detect fraudulent transactions. Such systems are inherently limited by the knowledge and experiences of the experts who establish these rules. Moreover, fraudsters have become adept at identifying and exploiting loopholes in these rules, enabling them to bypass these systems undetected. Additionally, the static nature of these systems makes them poorly equipped to adapt to new types of fraud that were not anticipated when the rules were defined.

Statistical and machine learning-based systems have offered some respite to these problems by introducing the ability to learn from historical transaction data. However, they too suffer from significant limitations. For instance, these systems often require a large volume of labeled training data to perform with acceptable accuracy. Such data can be challenging to obtain in sufficient quantity and quality, especially for new or infrequent types of fraud.

Furthermore, these systems may fail to detect sophisticated fraud schemes that mimic legitimate transaction patterns. For instance, distributed fraud attacks, where a single fraudulent operation is divided into numerous smaller transactions to avoid detection, often go unnoticed by these systems.

False positives are also a significant problem with existing fraud detection technologies. High false positive rates lead to unnecessary investigations, increased operational costs, and potentially negative customer experiences.

Lastly, existing fraud detection technologies are reactive rather than preventive. They typically identify fraudulent activities after they have occurred, leading to recovery efforts that can be time-consuming, costly, and damaging to an organization's reputation. This retrospective approach does not effectively prevent the initial occurrence of fraud, leaving the organizations and their customers vulnerable.

SUMMARY

Thus, there is a need for a more robust and adaptive fraud detection technology that can overcome these limitations. The present invention seeks to address this need by providing an improved system and method for detecting fraud that offers superior adaptability, scalability, and accuracy compared to existing technologies.

By considering these limitations, the present invention seeks to offer a solution that reduces the shortcomings of current fraud detection technologies by introducing a novel mechanism for accurately detecting fraudulent activities, thereby safeguarding the interests of businesses and consumers alike.

The present invention describes a computer-implemented method for real-time fraud detection, risk assessment, and mitigation. This method harnesses the capabilities of predictive analytics, permissions-based distributed ledger systems, smart contracts, and various sensor technologies.

The method initiates by obtaining a first set of data related to a specific event from a permissions-based distributed ledger system, which operates on smart contracts. These smart contracts automatically enforce and execute rules of transactions, offering a secure, decentralized, and automated mechanism for transaction handling.

Simultaneously, the method collects sensor data from a first apparatus. This data includes, but is not limited to, biometric data (such as facial recognition or fingerprint scans), location data (via GPS or similar technologies), and video data (from CCTV or other visual recording devices). Collectively, this multi-modal sensor data provides a comprehensive and nuanced dataset to enhance risk assessment accuracy.

The method then applies a first set of predictive analytics to the data from the distributed ledger and the collected sensor data. These analytics utilize machine learning algorithms trained on a first corpus of training data, including historical transaction data, known fraud patterns, and other relevant factors. This analysis predicts the first contextual usage data and generates a series of first prediction inferences about potential risks.

This first contextual usage data is also processed through a real-time predictive analytics system, which is trained on a second corpus of training data that may include real-time transaction patterns, behavioral biometric data, and additional risk indicators. The system generates a second plurality of prediction inferences.

The method continues by determining the risk status of the first set of data. This process involves applying a thresholding technique to the contextual usage data and the generated prediction inferences. If the assessed risk surpasses the predetermined threshold, it indicates potential fraudulent activity or other security risks.

A legal status is also generated by comparing the risk status, contextual usage data, and prediction inferences with a legal predictive analytics system. This system is trained on a third corpus of training data, which may contain legal case studies, regulatory compliance information, and legislation databases.

In the event of an identified risk, the method automatically executes a smart contract on the permissions-based distributed ledger system. This activation can freeze or reverse the transaction, or trigger other protective measures as defined by the smart contract.

Lastly, the method generates a graphical user interface (GUI) for display on a computing device. This GUI comprises elements that display the risk status, legal status associated with the usage data, and the storage location of the first set of data in the permissions-based distributed ledger system. This interface provides an intuitive and immediate presentation of risk assessment outcomes for users or administrators.

In summary, this invention offers an advanced method for real-time fraud detection, risk assessment, and intervention. It brings together sophisticated technologies like predictive analytics, permissions-based distributed ledger systems, smart contracts, and multi-modal sensor data, providing a robust and efficient tool for securing digital transactions and other activities.

BRIEF DESCRIPTION OF THE DRAWING FIGURES

The accompanying drawings illustrate several embodiments and, together with the description, serve to explain the principles of the invention according to the embodiments. It will be appreciated by one skilled in the art that the particular arrangements illustrated in the drawings are merely exemplary and are not to be considered as limiting of the scope of the invention or the claims herein in any way.

FIG. 1 illustrates a system for fraud detection and intervention in accordance with an exemplary embodiment of the invention FIG. 2 illustrates the processor system diagram in accordance with an exemplary embodiment of the invention FIG. 3 illustrates the method of fraud detection and intervention in accordance with an exemplary embodiment of the invention FIG. 4 illustrates one embodiment of the computing architecture that supports an embodiment of the inventive disclosure.

DETAILED DESCRIPTION OF EMBODIMENTS

Figure 1:
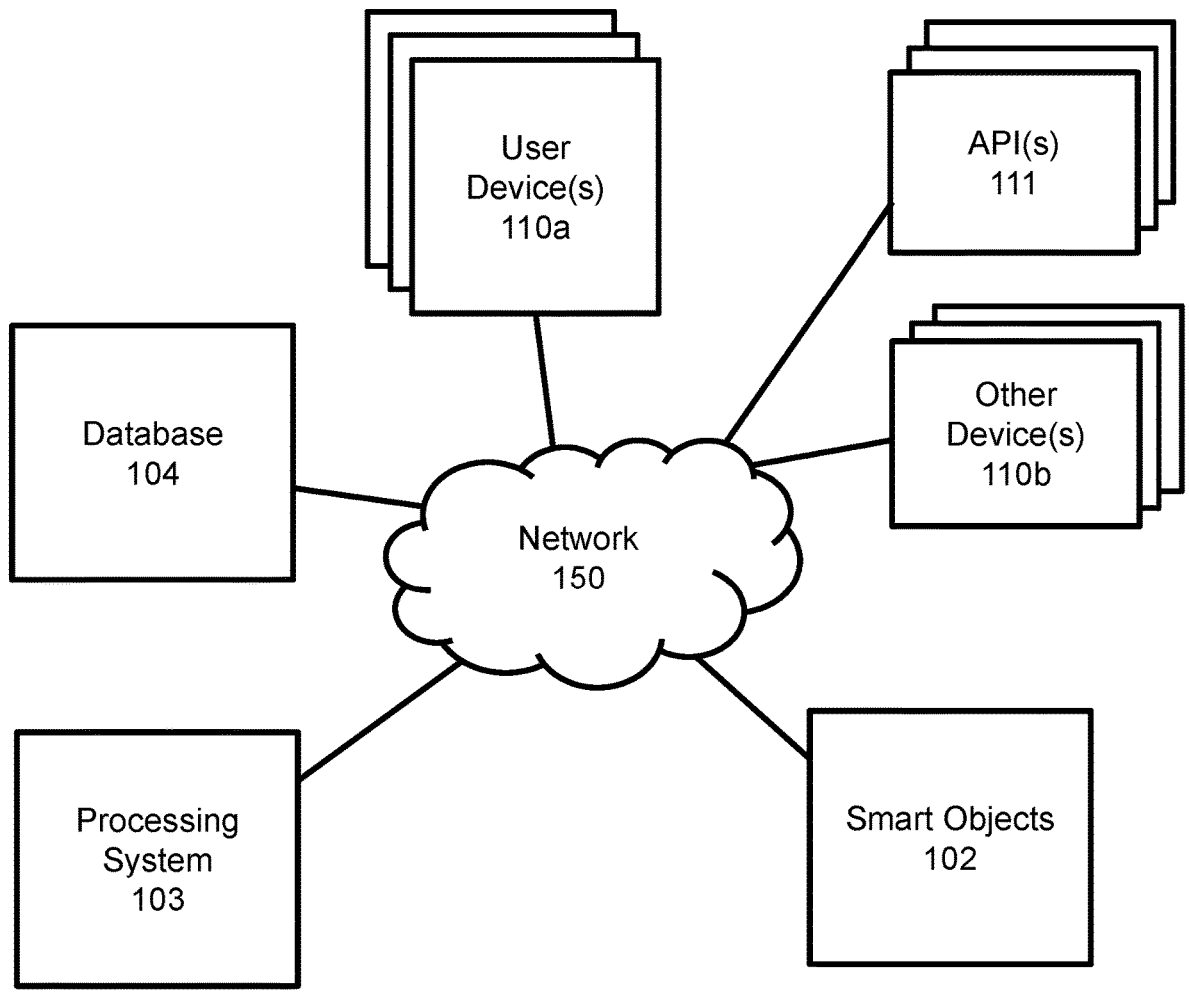

The artificial intelligence financial technology blockchain, hereinafter referred to as "AIFTB" technology of the present invention, in conjunction with the permissions based distributed ledger system, creates a robust, secure, ethical and transparent financial ecosystem, leveraging the power of artificial intelligence, blockchain, machine learning and advanced financial technologies. This innovative ecosystem has broad applications and can be integrated into various industries, including AI smart weapons and AI robots, enhancing their capabilities and ensuring ethical usage.

Transparency issues are addressed by the AIFTB through the accessibility of the blockchain. The blockchain keeps a register of the transactions that have taken place on it, and also other interactions related to those transactions. The blockchain allows for the easily viewable information for users to assist with auditing and confidence in the system.

Auditing the transactions usually requires analyzing large amounts of information by humans. These individuals do this afterwards to ensure compliance. However, the AI can analyze vast amounts of data in real-time, enabling continuous monitoring of financial transactions and automatic detection of anomalies or suspicious activities. This capability allows law enforcement agencies to identify and address potential issues more quickly and efficiently, ensuring better compliance with regulations. In order to ensure the AI makes proper decisions about the incoming data, this invention trains the AI through machine learning in various financial and interdisciplinary social sciences.

In order to maintain the accessibility of the blockchain to users, it is important that the supply be regulated. The AI is capable of creating and destroying currency in the blockchain in order to maintain appropriate levels. It is able to do this through proper training and predictive analytics based on interactions it has already observed.

Utilizing these predictions, the AI can determine if abuse is occurring within the system. This is accomplished in real time and when abuse is detected, the AI can flag transactions and hold funds to help make victims whole. This action helps provide recourse for users and prevents widespread fraud as funds can be held until a final judgment is reached.

In addition to the above benefits, The AIFTB technology can be utilized to enhance election security and transparency by creating a tamper-proof, transparent, and auditable voting system. The distributed ledger technology ensures that each vote is securely recorded, preventing any unauthorized changes or manipulation of voting data. The AI can be used to monitor and detect any anomalies or suspicious activities in real-time, ensuring the integrity of the electoral process. This application can significantly boost public trust and confidence in election outcomes.

One or more different embodiments may be described in the present application. Further, for one or more of the embodiments described herein, numerous alternative arrangements may be described; it should be appreciated that these are presented for illustrative purposes only and are not limiting of the embodiments contained herein or the claims presented herein in any way. One or more of the arrangements may be widely applicable to numerous embodiments, as may be readily apparent from the disclosure. In general, arrangements are described in sufficient detail to enable those skilled in the art to practice one or more of the embodiments, and it should be appreciated that other arrangements may be utilized and that structural, logical, software, electrical and other changes may be made without departing from the scope of the embodiments. Particular features of one or more of the embodiments described herein may be described with reference to one or more particular embodiments or figures that form a part of the present disclosure, and in which are shown, by way of illustration, specific arrangements of one or more of the aspects. It should be appreciated, however, that such features are not limited to usage in the one or more particular embodiments or figures with reference to which they are described. The present disclosure is neither a literal description of all arrangements of one or more of the embodiments nor a listing of features of one or more of the embodiments that must be present in all arrangements.

Headings of sections provided in this patent application and the title of this patent application are for convenience only and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible embodiments and in order to more fully illustrate one or more embodiments. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the embodiments, and does not imply that the illustrated process is preferred. Also, steps are generally described once per aspect, but this does not mean they must occur once, or that they may only occur once each time a process, method, or algorithm is carried out or executed. Some steps may be omitted in some embodiments or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other embodiments need not include the device itself.

Techniques and mechanisms described or referenced herein will sometimes be described in singular form for clarity. However, it should be appreciated that particular embodiments may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various embodiments in which, for example, functions may be executed out of order from that shown or discussed, including substantially concurrently or in reverse order, depending on the functionality involved, as would be understood by those having ordinary skill in the art.

The detailed description set forth herein in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

FIG. 1 illustrates the system embodying the current invention and the various components that make up the invention. One or more user device(s) 110a are able to connect to the database 104 to conduct transactions over an electronic network 150. These user devices 110a are also able to interact with other users through other devices 110b on the same network 150 to provide information to each other. In addition the processing system 103 is able to monitor and analyze the data being sent over the network 150 and make decisions about smart contracts being executed on the database 104. Also, a plurality of smart objects 102 are being monitored over the network 150 by the processing system 103. The various components described herein are exemplary and for illustration purposes only and any combination or subcombination of the various components may be used as would be apparent to one of ordinary skill in the art. The system may be reorganized or consolidated, as understood by a person of ordinary skill in the art, to perform the same tasks on one or more other servers or computing devices without departing from the scope of the invention.

The Smart Objects 102 on the system may include, but are not limited to, the following devices: a smart gun, smart knife, smart car, smart yacht, smart home, smart airplane, smart tank, smart sub, smart building, smart bomb and missile, smart security, smart toys, smart wallet, smart purse, smart stop light, smart drone, smart video camera, smart train, and smart mail truck. These objects are able to communicate over the electronic network 150 with the processing system 103 and database 104. The smart objects contain sensors that may include, but are not limited to location sensors, biometric sensors, and imaging systems. In addition the smart objects 102 are able to receive commands from the processing system 103. This communication and receipt of commands can be accomplished through a control chip on the smart objects 102.

The processing system 103 comprises the AI which is capable of receiving information from a variety of sources. This processing system may be a supervised AI, an unsupervised AI, a limited memory AI, or a reactive AI. The AI has been trained through machine learning techniques, which include but are not limited to a linear regression, a logistic regression, a decision tree, a SVM algorithm, a Naive Bayes algorithm, a KNN algorithm, a K-means, a Random forest algorithm, a dimensionality reduction algorithms, or a gradient boosting algorithm and AdaBoosting algorithm. The AI is trained on various sources of data which includes but is not limited to interdisciplinary social sciences, financial systems, and historical data sets. This processing system takes in large amounts of information from user devices 110, the database 104, smart objects 102 and Application Programming Interfaces, API 111. The processing system 103 is able to execute smart contracts on the database 104. The processing system 103 is also able to interact with the other devices 110b which are used by groups that include but not limited to law enforcement and regulatory agencies and assist with interagency collaboration through report generation.

The database 104 comprises a permissions based distributed ledger system that is capable of executing smart contracts. This database 104 maintains a record of transactions in an accessible manner and records of the sensor data from the smart objects 102. Through these records, behaviors can be predicted and analyzed by the processing system 103.

This can be used to ensure that individuals are practicing legal actions and even monitor impacts upon society and the environment.

User device(s) 110 include, generally, a computer or computing device including functionality for communicating (e.g., remotely) over a network 150. Data may be collected from user devices 110, and data requests may be initiated from each user device 110. User device(s) 110 may be a server, a desktop computer, a laptop computer, personal digital assistant (PDA), an in- or out-of-car navigation system, a smart phone or other cellular or mobile phone, or mobile gaming device, among other suitable computing devices. User devices 110 may execute one or more applications, such as a web browser (e.g., Microsoft Windows Internet Explorer, Mozilla Firefox, Apple Safari, Google Chrome, and Opera, etc.), or a dedicated application to submit user data, or to make prediction queries over a network 150.

In particular embodiments, each user device 110 may be an electronic device including hardware, software, or embedded logic components or a combination of two or more such components and capable of carrying out the appropriate functions implemented or supported by the user device 110. For example and without limitation, a user device 110 may be a desktop computer system, a notebook computer system, a netbook computer system, a handheld electronic device, or a mobile telephone. The present disclosure contemplates any user device 110. A user device 110 may enable a network user at the user device 110 to access network 150. A user device 110 may enable its user to communicate with other users at other user devices 110.

A user device 110 may have a web browser, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user device 110 may enable a user to enter a Uniform Resource Locator (URL) or other address directing the web browser to a server, and the web browser may generate a Hyper Text Transfer Protocol (HTTP) request and communicate the HTTP request to server. The server may accept the HTTP request and communicate to the user device 110 one or more Hyper Text Markup Language (HTML) files responsive to the HTTP request. The user device 110 may render a web page based on the HTML files from server for presentation to the user. The present disclosure contemplates any suitable web page files. As an example and not by way of limitation, web pages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a web page encompasses one or more corresponding web page files (which a browser may use to render the web page) and vice versa, where appropriate.

The user device 110 may also include an application that is loaded onto the user device 110. The application obtains data from the network 150 and displays it to the user within the application interface.

Exemplary user devices are illustrated in some of the subsequent figures provided herein. This disclosure contemplates any suitable number of user devices, including computing systems taking any suitable physical form. As example and not by way of limitation, computing systems may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, the computing system may include one or more computer systems; be unitary or distributed; span multiple locations; span multiple machines; or reside in a cloud, which may include one or more cloud components in one or more networks. Where appropriate, one or more computing systems may perform without substantial spatial or temporal limitation one or more steps of one or more methods described or illustrated herein. As an example, and not by way of limitation, one or more computing systems may perform in real time or in batch mode one or more steps of one or more methods described or illustrated herein. One or more computing system may perform at different times or at different locations one or more steps of one or more methods described or illustrated herein, where appropriate.

The API 111 can be used to access the information stored on the database 104. The permissioned API 111 would act as a gateway between the user devices 110 and the database 104, providing a standardized and controlled interface for accessing and managing asset tracking functionality. Users with the necessary permissions would be able to connect to the API and utilize the provided services to track and monitor assets. A Software as as Service, SaaS, model would involve users subscribing to at least one service and accessing the asset tracking functionalities in the database 104 through a web interface or other client applications. Users would interact with the API, 111 which, in turn, interacts with the database 104 to provide real-time asset tracking information. Alternatively, the API 111 can also be used to feed information to the database 104.

Network cloud 150 generally represents a network or collection of networks (such as the Internet or a corporate intranet, or a combination of both) over which the various components illustrated in FIG. 1 (including other components that may be necessary to execute the system described herein, as would be readily understood to a person of ordinary skill in the art). In particular embodiments, network 150 is an intranet, an extranet, a virtual private network (VPN), a local area network (LAN), a wireless LAN (WLAN), a wide area network (WAN), a metropolitan area network (MAN), a portion of the Internet, or another network 150 or a combination of two or more such networks 150. One or more links connect the systems and databases described herein to the network 150. In particular embodiments, one or more links each includes one or more wired, wireless, or optical links. In particular embodiments, one or more links each includes an intranet, an extranet, a VPN, a LAN, a WLAN, a WAN, a MAN, a portion of the Internet, or another link or a combination of two or more such links. The present disclosure contemplates any suitable network 150, and any suitable link for connecting the various systems and databases described herein.

The network 150 connects the various systems and computing devices described or referenced herein. In particular embodiments, network 150 is an intranet, an extranet, a virtual private network (VPN), a local area network (LAN), a wireless LAN (WLAN), a wide area network (WAN), a metropolitan area network (MAN), a portion of the Internet, or another network 421 or a combination of two or more such networks 150. The present disclosure contemplates any suitable network 150.

One or more links couple one or more systems, engines or devices to the network 150. In particular embodiments, one or more links each includes one or more wired, wireless, or optical links. In particular embodiments, one or more links each includes an intranet, an extranet, a VPN, a LAN, a WLAN, a WAN, a MAN, a portion of the Internet, or another link or a combination of two or more such links. The present disclosure contemplates any suitable links coupling one or more systems, engines or devices to the network 150.

In particular embodiments, each system or engine may be a unitary server or may be a distributed server spanning multiple computers or multiple datacenters. Systems, engines, or modules may be of various types, such as, for example and without limitation, web server, news server, mail server, message server, advertising server, file server, application server, exchange server, database server, or proxy server. In particular embodiments, each system, engine or module may include hardware, software, or embedded logic components or a combination of two or more such components for carrying out the appropriate functionalities implemented or supported by their respective servers. For example, a web server is generally capable of hosting websites containing web pages or particular elements of web pages. More specifically, a web server may host HTML files or other file types, or may dynamically create or constitute files upon a request, and communicate them to client/user devices or other devices in response to HTTP or other requests from client devices or other devices. A mail server is generally capable of providing electronic mail services to various client devices or other devices. A database server is generally capable of providing an interface for managing data stored in one or more data stores.

In particular embodiments, one or more data storages may be communicatively linked to one or more servers via one or more links. In particular embodiments, data storages may be used to store various types of information. In particular embodiments, the information stored in data storages may be organized according to specific data structures. In particular embodiment, each data storage may be a relational database. Particular embodiments may provide interfaces that enable servers or clients to manage, e.g., retrieve, modify, add, or delete, the information stored in data storage.

Figure 2:
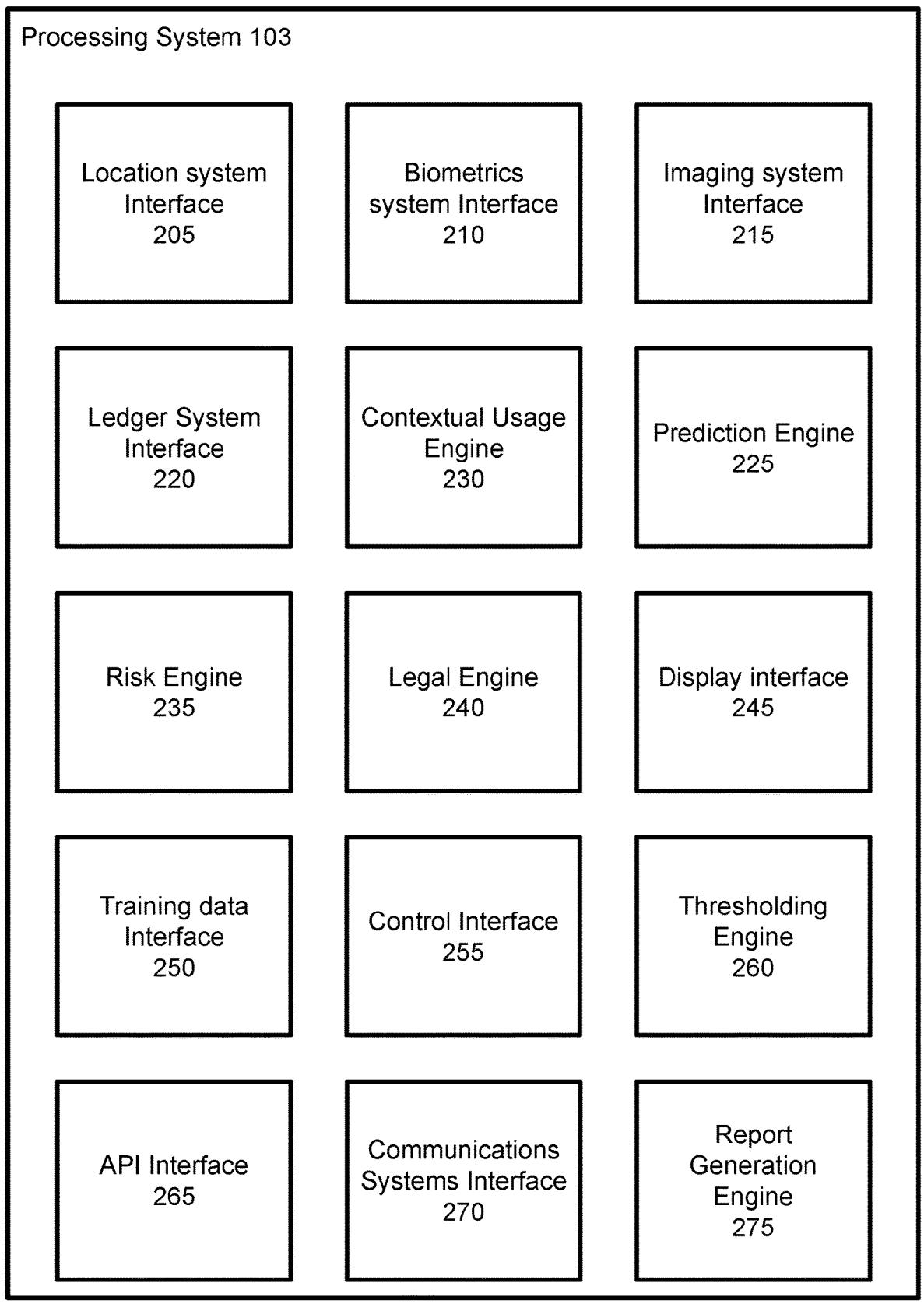

FIG. 2 illustrates an example computing environment in accordance with an exemplary embodiment of the present invention. The computing environment may comprise but are not limited to a series of interfaces used to gather information which include a location system interface 205, a biometrics system interface 210, an imaging system interface 215, and a ledger system interface 220. In addition there is a set of data that is used to train the processing system 103 that is obtained from the training data interface 250. The processing system 103 also has a series of engines used to analyze the incoming data which include contextual usage engine 225, a prediction engine 230, a risk engine 235, a legal engine 240, a thresholding engine 260 and a report generation engine 275. There are also a series of interfaces used to communicate with users which include a display interface 245, a control interface 255, an API interface 265, and communication systems interface 270. The processing system is able to receive the various data sets, analyze them through a series of predictive analytics and generate a report and series of commands for executing smart contracts on the database 104.

The location system interface 205 interacts with the location sensors on the smart objects 102. These location sensors utilize at least one of Global Positioning System (GPS) data, Global Navigation Satellite System (GLONASS) data, and Galileo data to monitor where the smart objects 102 are located. In one exemplary embodiment, this data is compared to safe zones in order to ensure that smart objects are not being used in areas they should not be. This could be for example, a smart gun being brought to a school zone. The school zone would be a safe zone, and the processing system 103 would recognize that the smart gun is in an area it should not be located. The processor could then communicate and issue commands to the smart gun to ensure it is being used in a legal and ethical way.

The biometrics system interface 210 interacts with the biometric sensors on the smart objects 102 or other user devices 110b. For example, these biometric sensors are used to ensure that the user of the object or user of a smart voting system is who they say they are. The processor is able to compare the biometric data obtained from the biometric systems interface 210, with verified user information stored in the database 104. These biometric sensors can include at least one of fingerprint images, iris images and facial images. By verifying the user, the processing system 103 is able to determine if a proper individual is utilizing the system.

The imaging system interface 215 interacts with the imaging sensors on the smart objects 102. These images can be gathered from cameras and verify proper usage of the system. The processor is able to compare the images to known images stored in the database 104. These images can be used for verification purposes or to make predictions about what is occurring at the location where the images are obtained. The imaging system interface may also take in audio captured by a video camera as well.

The ledger system interface 220 allows the processor to obtain information from the database 104 comprising a permissions based distributed ledger system. The interface can scan the information in the database 104 to monitor transactions occurring in real time. These transactions can be compared to previous transactions held within the database 104 and see if similar known actions have occurred in the past. In addition to receiving information, the interface allows the processor to issue commands to the database 104. These commands can be used to execute smart contracts on the database 104. Various types of smart contracts can be executed for example, at least one of Smart Legal Contracts, Decentralized Autonomous Organizations (DAO), and Application Logic Contracts (ALC). Alternatively, the ledger system interface 220 is used to lend users currency on the database 104.

In one embodiment, the ledger system interface (220) serves as a channel enabling the processor to access, analyze, and manipulate data stored within the database (104), a permissions-based distributed ledger system. The interface scans transactional information within the database (104) in real-time, monitoring current transactions as they occur and comparing them against historical transactional data. This process aids in identifying recurring patterns or detecting anomalies, thereby enabling a proactive approach towards risk management.

Apart from data retrieval, the ledger system interface (220) empowers the processor to issue directives to the database (104). These directives primarily involve the execution of smart contracts. Such contracts are self-executing, blockchain-based contracts where the terms of the agreement are directly written into code. The smart contracts may fall into various categories, including but not limited to, Smart Legal Contracts that encapsulate legally binding obligations, Decentralized Autonomous Organizations (DAOs) that are governed by smart contracts, and Application Logic Contracts (ALCs) that automate business processes.

Additionally, the ledger system interface (220) facilitates the provision of digital currency loans to users within the distributed ledger system. This demonstrates another key function of the interface, emphasizing its multifaceted role within the overall system. In essence, the ledger system interface (220) provides a pivotal bridge between the processor and the database (104), enabling real-time monitoring, risk analysis, command execution, and financial transactions within the permissions-based distributed ledger system.

The prediction engine 225 is used by the processing system 103 to make predictions based on the sensor data and the transactional data present in the user interactions within the database 104 and with the surrounding environment. This prediction engine has been trained on the interdisciplinary social sciences through the use of Optical Character Recognition(OCR) to gather information on topics that include, but are not limited to Economics, Psychology, Sociology, Anthropology, and Political Science. Alternatively, the topics may include the physical sciences either in place of or in addition to the previously mentioned topics. This training is accomplished through machine learning techniques such as a linear regression, a logistic regression, a decision tree, a SVM algorithm, a Naive Bayes algorithm, a KNN algorithm, a K-means, a Random forest algorithm, a dimensionality reduction algorithms, or a gradient boosting algorithm and AdaBoosting algorithm. The prediction engine is then able to produce a contextual usage data set which represents what the processor believes is occurring.

The contextual usage engine 230 is used by the processing system 103 to make predictions based on the contextual usage data and the data stored in the database 104. The contextual usage engine is trained upon previous risk calculation results produced by the processing system 103. This training is accomplished through machine learning techniques such as a linear regression, a logistic regression, a decision tree, a SVM algorithm, a Naive Bayes algorithm, a KNN algorithm, a K-means, a Random forest algorithm, a dimensionality reduction algorithms, or a gradient boosting algorithm and AdaBoosting algorithm. This engine helps refine the predictions made by the prediction engine.

The risk engine 235 is used to analyze the data produced by the contextual usage engine. Once the processing system 103 has determined what actions are occurring, it needs to determine the potential for fraud or risky behavior. This engine uses the same training information found in both the prediction engine and the contextual use engine. It determines through integration with the thresholding engine 260, whether or not to label a behavior risky. This could be but not limited to as simple as seeing if a weapon is in an area it is not supposed to be located at; or as complex as analyzing a series of transactions, location, biometric and video data to observe if worker abuse is occurring.

The legal engine 240 works alongside the risk engine 235 to see if any laws have been violated. The legal engine is trained on various legal papers, laws, and regulations for local, state, federal, and world issues. It is able to apply this training to the usage data and perform a threshold analysis on it to see if laws are being obeyed. It pairs this information with the risk engine 235 when determining how a smart contract is to be executed on the database 104.

The display interface 245 is used by the processing system 103. To communicate with users. It is able to communicate with a monitor or display to send out reports and other information requested by users. The displays can include but are not limited to computer screens, televisions, and mobile phone screens.

The training data interface 250 allows the processing system 103 and the various engines 225, 230, 235, 240 to access training information. The training data discussed above may also include at least one of industry practices, historical behavioral data, or obsolescence predictions. This training data may be stored on media separate from the database 104, or on the database 104.

The control interface 255 allows the processing system 103 to issue commands to the smart objects 102. These commands are determined by the risk and legal engines 235, 240. These commands are used to bring the smart objects into a state that is more in line with less risky and more legal practices. This can include, but is not limited to sending an alert, sending movement commands, or disabling the smart object 102.

The thresholding engine 260 assists the risk and legal engines to determine if the contextual usage data indicates risky or potentially illegal behavior. The thresholding engine uses at least one of a global threshold model, a liability threshold model, or a segmented regression analysis in order to determine an appropriate threshold to set for various activities.

The API interface 265 grants access to specific users or entities to the processing system 103 and database 104, These users can utilize a permissioned API to track assets. With a permissioned blockchain, control over who can participate in the network and access the database's 102 data and functionalities is managed. The permissioned API 111 would act as a gateway between the users and the database 104, providing a standardized and controlled interface for accessing and managing asset tracking functionality. Users with the necessary permissions would be able to connect to the API 111 and utilize the provided services to track and monitor assets.

The communication systems interface 270 allows the processing system 103 to assist communication between the smart objects 102 or other devices 110b and the database 104. Through this interface, commands can be sent from these objects and devices back to the database 104.

The report generation engine 275 takes the information from the risk and legal engines and creates a report and series of commands for the smart contracts on the database 104. This report can summarize the risks and legal issues surrounding an interaction on the database 104. In addition the report generation engine 275 will interact with the display interface 245 to send the report for user viewing. The report generation engine also will determine which parties should be alerted to the report.

Figure 3:
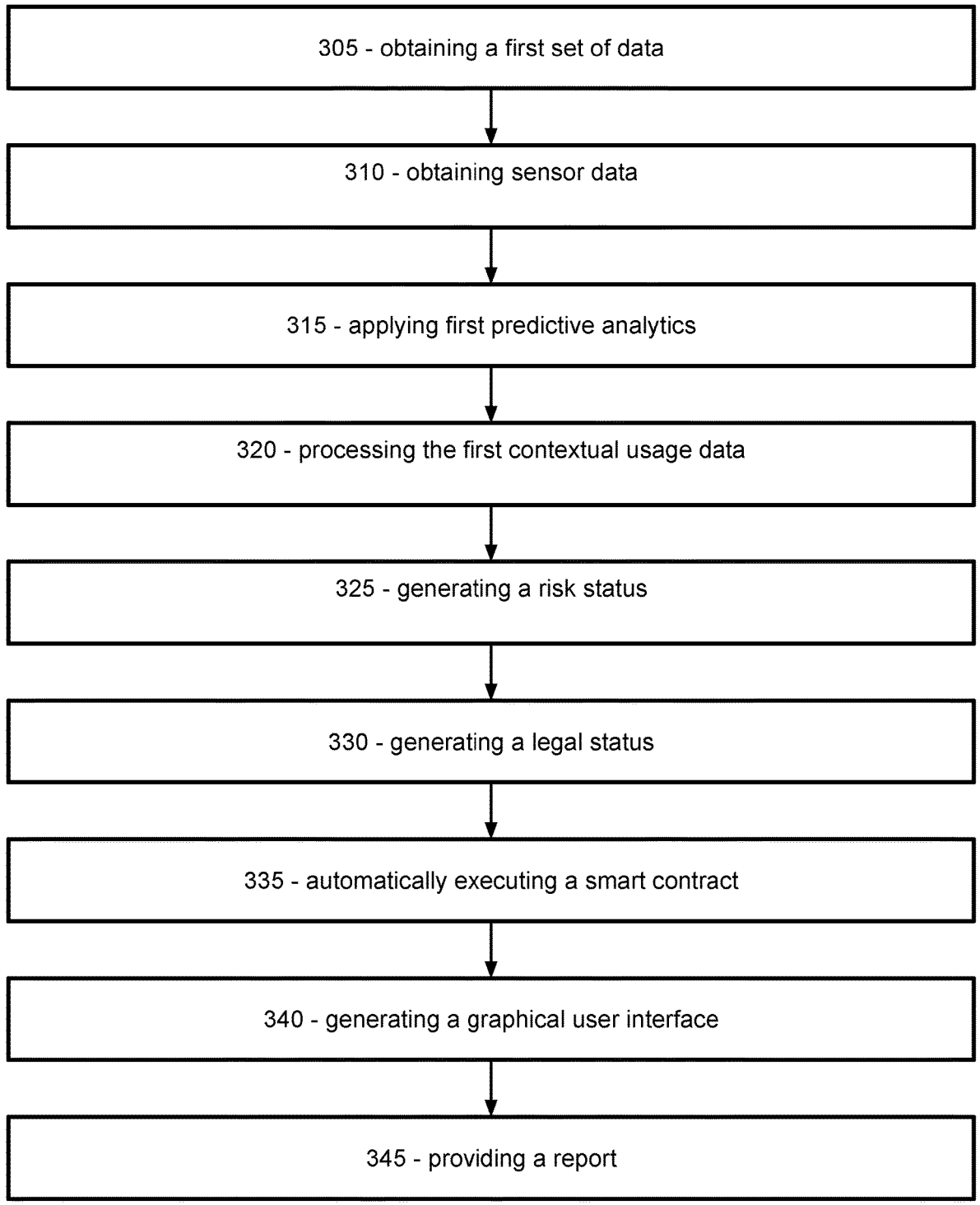

FIG. 3 illustrates an exemplary process for fraud detection within the processing system 103. These steps include obtaining a first set of data 305, obtaining sensor data 310, applying a first predictive analytics 315, analyzing the first contextual usage data 320, generating a risk status for the usage data 325, generating a legal status 330, executing the smart contract automatically 335, generating a report 340, and sending the report to the appropriate parties 345.

First, the system obtains a first set of data 305 from an outside source. This information can be for example, but not limited to a transaction, financial data, or voting data. This data is what will be analyzed by the AI for compliance and fraud detection. This dataset may encapsulate a diverse range of data points, including user credentials, transaction histories, time-stamps, digital signatures, and more. This acquisition is performed using high-speed, secure data transfer protocols that ensure data integrity and confidentiality.

The process further comprises obtaining sensor data 310 from the various sensors present at the location near where the first set of data 305 step was conducted. This sensor data can include biometric data, location data and video data. These sensors alternatively can capture audio as well. These sensors could be tracking location via GPS, GLONASS, or Galileo systems, environmental conditions via temperature, humidity, or pressure sensors, or even user-specific biometrics via fingerprint or iris scanners. This sensor data provides critical insights into the real-time state and context of the smart objects.

Next, the processing system applies a first predictive analytics 315 to the first set of data and the sensor data. This step begins to understand what actions are occurring in relation to the first set of data. By observing the biometric information a determination of the identity of the user is made and if they are an appropriate user. The location data can determine where the user is and if they are in motion, and the video data can capture images and help determine what actions are occurring. These sets of data in an embodiment of the invention are compared to information from interdisciplinary social sciences to see what actions are taking place. A threshold is set to ensure there are no false positives. The collected data sets from the ledger system and sensors are then processed using a state-of-the-art predictive analytics module. This module leverages advanced machine learning models, such as neural networks or support vector machines, that are trained on a diverse and extensive corpus of historical data. These algorithms generate insightful predictions about future behavior, identify anomalous patterns, and highlight potential risks within the system. The system eventually produces a first set of contextual usage data which is its best approximation of the activity occurring.

Next, the first contextual usage data is analyzed 320 by comparing it to activity that has occurred previously. This step helps refine the predictions from the first data set and the sensor data. The system for analysis has been trained on successful predictions made previously to determine what is the most likely activity occurring related to the first set of data. Thresholding is used to see how close of a match the current activity is to historical data.

After analyzing the first contextual usage data 320, the system generates a risk status for the usage data 325. This risk status is derived from the predictive analytics to see if there is a potential for fraud occurring. In one embodiment, this involves applying thresholding and anomaly detection techniques to the contextual usage data and prediction inferences. This level of risk uses a thresholding method to determine if an activity is risky or not and make a recommendation to the smart contract on further steps. The threshold is determined through the AI trained on interdisciplinary social science information and historical information. Alternatively a risk data set could be used to train the AI to determine fraud risk.

Afterwards or simultaneously as the risk status is generated the processing system also generates a legal status 330 for the usage data. This legal status is derived from the predictive analytics to see if there is a potential for fraud occurring. This legal analysis uses a thresholding method to determine if an activity is legal or not and make a recommendation to the smart contract on further steps. The threshold is determined through the AI trained on legal papers and sets of rules and laws. For example, this process involves a comparative analysis between the contextual usage data, prediction inferences, and a legal predictive analytics system. The legal system, trained on a separate, law-focused corpus of data, can effectively determine the legality of the current usage, thereby ensuring compliance with applicable laws and regulations.

With this information generated, the system is able to execute the smart contract automatically 335. The system does this by communicating from a processor to a database. These commands may include, but are not limited to executing the request as intended or pausing the request or flagging the transactions associated with the request. The decision as to which course to take is determined by the AI and its conclusions of risk and legal consequences. In other words, depending on the assessed risk and legal statuses, the system can trigger the automatic execution of a smart contract on the permissions-based distributed ledger system. These smart contracts, encoded with predefined rules and conditions, could instigate diverse outcomes such as transaction validation or rejection, account flagging, security protocol activation, or transaction reversal, thereby providing real-time responses to identified issues.

The processing system is then able to generate a report 340 detailing the decisions made and the risk and legal analysis associated with the decision. This report also flags the transactions within a database to make it easier for a user to find and audit these decisions. These users would be authorized by the system to grant access to these reports when a proper request was made. In one embodiment, the system formulates a detailed report. This document encapsulates all steps undertaken, the rationale behind each decision, the prediction inferences, and the resultant actions. It also records any changes made to the ledger system, offering a transparent record of the process.

Lastly, the system sends the report to the appropriate parties 345 as determined by the results of the risk and legal analysis. For example, if the AI determined there was a crime committed, it would alert law enforcement to the crime and provide the report generated earlier 340. Alternatively, if a financial issue was discovered it may be more appropriate to contact banking authorities. This can include system administrators for oversight purposes, law enforcement agencies for potential legal action, directly involved users for their record, or regulatory bodies for compliance purposes.

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or other appropriate virtual environments).

Any of the above mentioned systems, units, modules, engines, controllers, interfaces, components or the like may be and/or comprise hardware and/or software as described herein. For example, the enterprise system 101, the query wise stateless structure engine 110, the large language model (LLM) system 120, the network 150, and subcomponents thereof may be and/or comprise computing hardware and/or software as described herein in association with FIGS. 4-7. Furthermore, any of the above mentioned systems, units, modules, engines, controllers, interfaces, components or the like may use and/or comprise an application programming interface (API) for communicating with other systems units, modules, engines, controllers, interfaces, components, or the like for obtaining and/or providing data or information.

Figure 4:
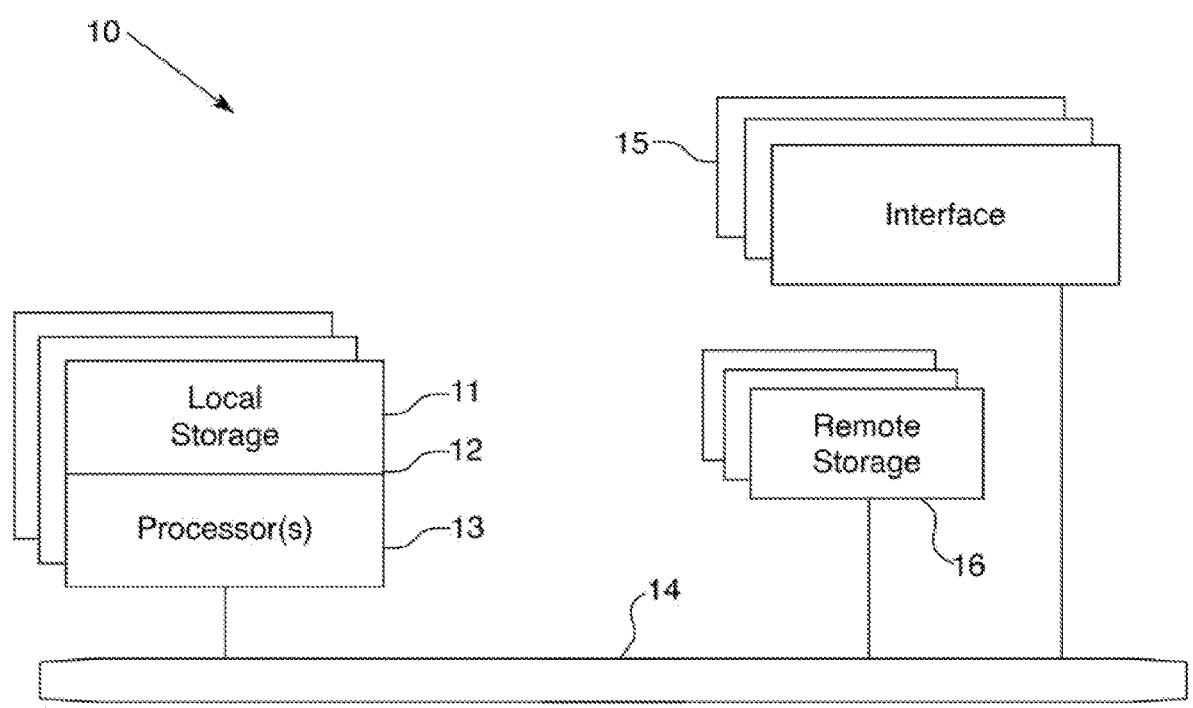

Referring now to FIG. 4, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one aspect, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one aspect, a computing device 10 may be configured or designed to function as a server system utilizing CPU 12, local memory 11 and/or remote memory 16, and interface(s) 15. In at least one aspect, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some embodiments, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a particular aspect, a local memory 11 (such as non-volatile random-access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAPDRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one aspect, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™M, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 4 illustrates one specific architecture for a computing device 10 for implementing one or more of the embodiments described herein, it is by no means the only device architecture on which at least a portion of the features and techniques described herein may be implemented. For example, architectures having one or any number of processors 13 may be used, and such processors 13 may be present in a single device or distributed among any number of devices. In one aspect, single processor 13 handles communications as well as routing computations, while in other embodiments a separate dedicated communications processor may be provided. In various embodiments, different types of features or functionalities may be implemented in a system according to the aspect that includes a client device (such as a tablet device or smartphone running client software) and server systems (such as a server system described in more detail below).

Regardless of network device configuration, the system of an aspect may employ one or more memories or memory modules (such as, for example, remote memory block 16 and local memory 11) configured to store data, program instructions for the general-purpose network operations, or other information relating to the functionality of the embodiments described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 5:
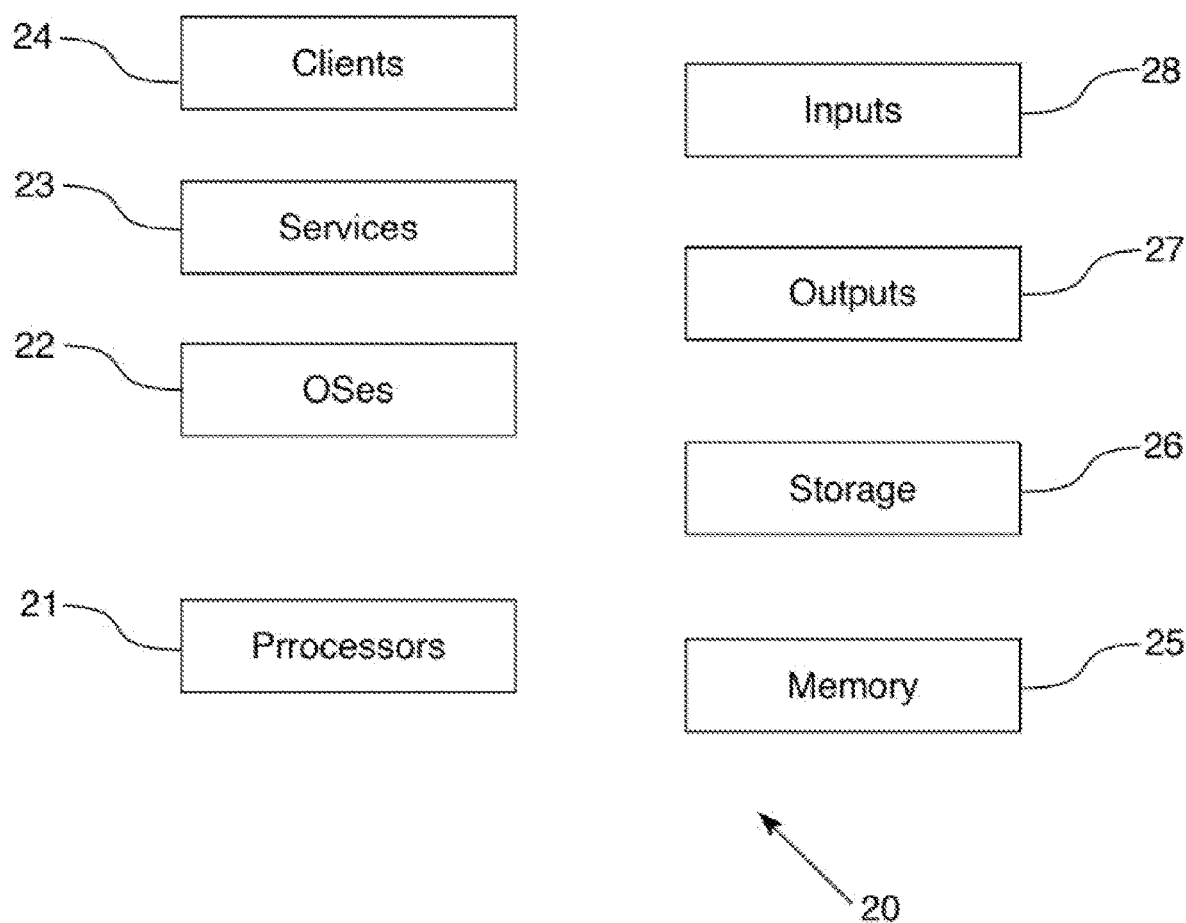
FIG. 5 illustrates components of a system architecture that supports an embodiment of the inventive disclosure.

In some embodiments, systems may be implemented on a standalone computing system. Referring now to FIG. 5, there is shown a block diagram depicting a typical exemplary architecture of one or more embodiments or components thereof on a standalone computing system. Computing device 20 includes processors 21 that may run software that carry out one or more functions or applications of embodiments, such as for example a client application. Processors 21 may carry out computing instructions under control of an operating system 22 such as, for example, a version of MICROSOFT WINDOWS™ operating system, APPLE macOS™ or iOS™ operating systems, some variety of the Linux operating system, ANDROID™M operating system, or the like. In many cases, one or more shared services 23 may be operable in system 20, and may be useful for providing common services to client applications. Services 23 may for example be WINDOWS™M services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 4). Examples of storage devices 26 include flash memory, magnetic hard drive, CD-ROM, and/or the like.

Figure 6:
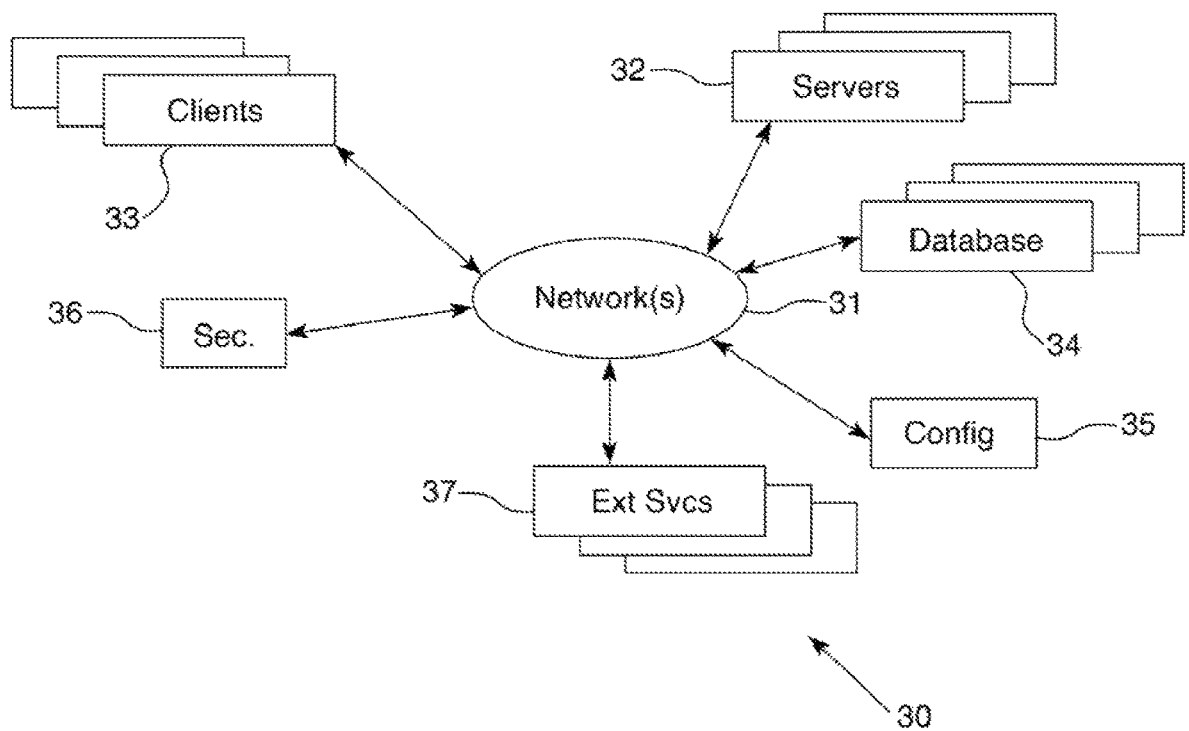
FIG. 6 illustrates components of a computing device that supports an embodiment of the inventive disclosure.

In some embodiments, systems may be implemented on a distributed computing network, such as one having any number of clients and/or servers. Referring now to FIG. 6, there is shown a block diagram depicting an exemplary architecture 30 for implementing at least a portion of a system according to one aspect on a distributed computing network. According to the aspect, any number of clients 33 may be provided. Each client 33 may run software for implementing client-side portions of a system; clients may comprise a system 20 such as that illustrated in FIG. 5. In addition, any number of servers 32 may be provided for handling requests received from one or more clients 33. Clients 33 and servers 32 may communicate with one another via one or more electronic networks 31, which may be in various embodiments any of the Internet, a wide area network, a mobile telephony network (such as CDMA or GSM cellular networks), a wireless network (such as WiFi, WiMAX, LTE, and so forth), or a local area network (or indeed any network topology known in the art; the aspect does not prefer any one network topology over any other). Networks 31 may be implemented using any known network protocols, including for example wired and/or wireless protocols.

In addition, in some embodiments, servers 32 may call external services 37 when needed to obtain additional information, or to refer to additional data concerning a particular call. Communications with external services 37 may take place, for example, via one or more networks 31. In various embodiments, external services 37 may comprise web-enabled services or functionality related to or installed on the hardware device itself. For example, in one aspect where client applications are implemented on a smartphone or other electronic device, client applications may obtain information stored in a server system 32 in the cloud or on an external service 37 deployed on one or more of a particular enterprise's or user's premises.

In some embodiments, clients 33 or servers 32 (or both) may make use of one or more specialized services or appliances that may be deployed locally or remotely across one or more networks 31. For example, one or more databases 34 may be used or referred to by one or more embodiments. It should be understood by one having ordinary skill in the art that databases 34 may be arranged in a wide variety of architectures and using a wide variety of data access and manipulation means. For example, in various embodiments one or more databases 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some embodiments, variant database architectures such as column-oriented databases, in-memory databases, clustered databases, distributed databases, or even flat file data repositories may be used according to the aspect. It will be appreciated by one having ordinary skill in the art that any combination of known or future database technologies may be used as appropriate, unless a specific database technology or a specific arrangement of components is specified for a particular aspect described herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, some embodiments may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments without limitation, unless a specific security 36 or configuration system 35 or approach is specifically required by the description of any specific aspect.

Figure 7:
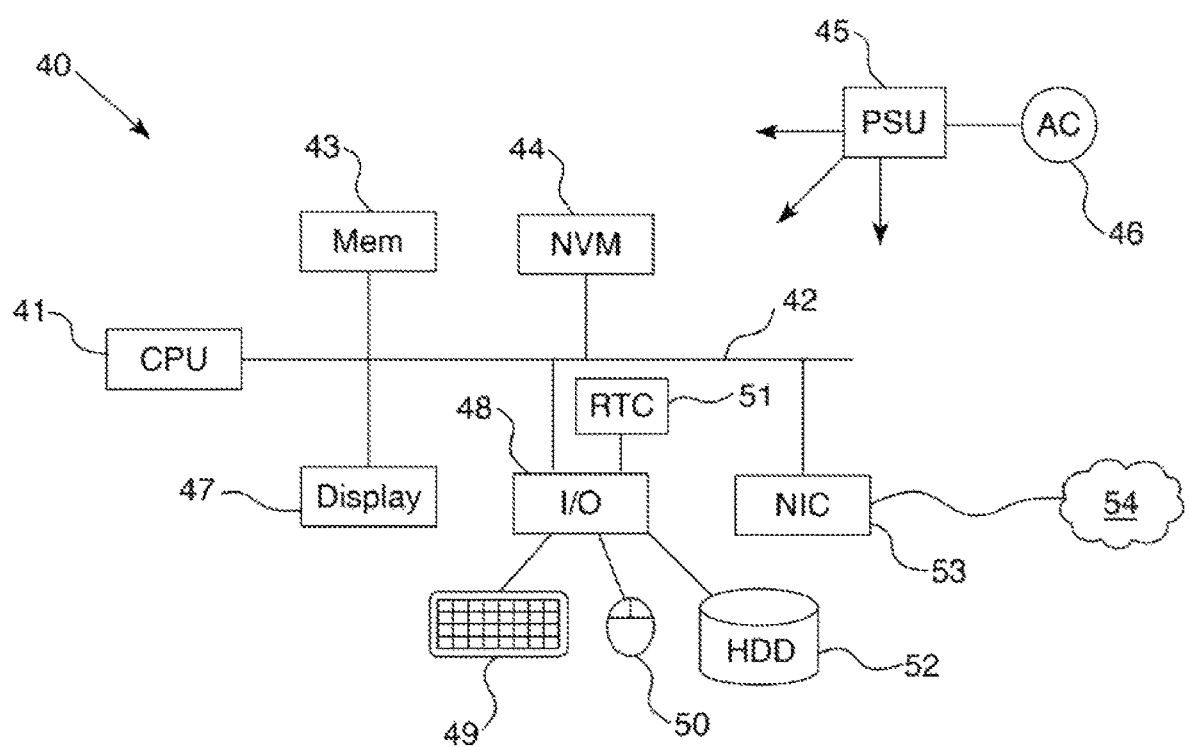
FIG. 7 illustrates components of a computing device that supports an embodiment of the inventive disclosure.

FIG. 7 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to keyboard 49, pointing device 50, hard disk 52, and real-time clock 51. NIC 53 connects to network 54, which may be the Internet or a local network, which local network may or may not have connections to the Internet. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various embodiments, functionality for implementing systems or methods of various embodiments may be distributed among any number of client and/or server components. For example, various software modules may be implemented for performing various functions in connection with the system of any particular aspect, and such modules may be variously implemented to run on server and/or client components.

The skilled person will be aware of a range of possible modifications of the various embodiments described above. Accordingly, the present invention is defined by the claims and their equivalents.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for facilitating database queries through the disclosed principles herein. Thus, while particular embodiments and applications have been illustrated and described, it is to be understood that the disclosed embodiments are not limited to the precise construction and components disclosed herein. Various apparent modifications, changes and variations may be made in the arrangement, operation and details of the method and apparatus disclosed herein without departing from the spirit and scope defined in the appended claims.

What is claimed is:

1. A computer implemented method for fraud detection, risk assessment, and intervention, the computer implemented method comprising:
   obtaining a first set of data from a permissions based distributed ledger system, the first set of data associated with a first event, wherein the distributed ledger system is enabled to execute transactions based on a smart contract;
   obtaining sensor data associated with a first apparatus, the sensor data comprising biometric data associated with the first apparatus, location data associated with the first apparatus, and/or video data associated with the first apparatus, wherein the first apparatus further comprises providing a control chip designed to effect the operation of the first apparatus related to the first set of data and capable of communicating with the permissions based distributed ledger system;

applying a real-time first predictive analytics via a first machine learning algorithm to the obtained first set of data, the obtained biometric data, the obtained location data, and/or the obtained video data to predict contextual usage data to generate a first plurality of prediction inferences, wherein the first predictive analytics is trained on a first corpus of training data, wherein the first machine learning algorithm is enabled by a first Artificial Intelligence processing system, the first Artificial Intelligence processing system comprises an unsupervised Artificial Intelligence, the unsupervised artificial intelligence system being trained on at least one of interdisciplinary social sciences data, financial systems data, and/or historical data sets;

processing the contextual usage data predicted by the first predictive analytics on a second real-time predictive analytics-via a second machine learning algorithm to generate a second plurality of prediction inferences,; wherein the real-time second predictive analytics system is trained on a second corpus of training data, wherein the second machine learning algorithm is enabled by a second Artificial Intelligence processing system, the second Artificial Intelligence processing system comprises an unsupervised Artificial Intelligence, the unsupervised artificial intelligence system being trained on at least one of interdisciplinary social sciences data, financial systems data, and/or historical data sets;

automatically generating a risk status of the first set of data from the permissions based distributed ledger system by determining whether the obtained first set of data is associated with a plurality of risks by applying a thresholding technique to the contextual usage data and the first and/or the second plurality of prediction inferences;

automatically generating a legal status by comparing the generated risk status, the contextual usage data, and the first and/or the second plurality of prediction inferences with a legal predictive analytics system, wherein the legal predictive analytics system is trained on a third corpus of training data;

automatically executing a smart contract to enable preventative intervention on the permissions based distributed ledger system based on whether the first set of data was determined to be associated with a plurality of risks, wherein executing a smart contract may comprise freezing and/or reversing the transaction, and/or triggering protective measures to impede a predetermined behavior, wherein triggering protective measures may comprise a set of instructions; and sending a set of instructions to the control chip based on the calculation of the plurality of risks.

2. The computer implemented method according to claim 1, wherein the location data is compared to a set of predefined location areas.

3. The computer implemented method according to claim 1, wherein the biometric data is compared to a set of authorized user biometric data.

4. The computer implemented method according to claim 1, wherein the biometric data is gathered from fingerprint images, iris images and/or facial images.

5. The computer implemented method according to claim 1, wherein the location data is gathered from Global Positioning System data, GLObalnaya NAvigatsionnaya Sputnikovaya Sistema data, and/or Galileo data.

6. The computer implemented method according to claim 1, wherein the video data is gathered from a camera.

7. The computer implemented method according to claim 6, wherein the video data is captured and evaluated in real time.

8. The computer implemented method according to claim 1, wherein the step of applying predictive analytics further comprises utilizing data from industry practices, historical behavioral data, obsolescence predictions, and/or a second set of data received at a separate time than the first set of data.

9. The computer implemented method according to claim 1, wherein the first corpus of training data is obtained by an Optical Character Recognition and weighting system is used to extract data and rules from peer reviewed interdisciplinary social science papers.

10. The computer implemented method according to claim 1, wherein the second corpus of training data is obtained from previous risk calculation results produced by the intervention system.

11. The computer implemented method according to claim 1, wherein the third corpus of training data is obtained by an Optical Character Recognition and weighting system is used to extract data and rules from legal papers.

12. The computer implemented method according to claim 1, wherein the Artificial Intelligence processing system is trained by a linear regression, a logistic regression, a decision tree, a support vector machine algorithm, a Naive Bayes algorithm, a k-nearest neighbors algorithm, a K-means, a Random forest algorithm, a dimensionality reduction algorithms, and/or a gradient boosting algorithm and AdaBoosting algorithm.

13. The computer implemented method according to claim 1, wherein the thresholding technique utilizes a global threshold model, a liability threshold model, and/or a segmented regression analysis.

14. The computer implemented method according to claim 1, wherein the smart contract execution is accomplished by Smart Legal Contracts, Decentralized Autonomous Organizations (DAO), and/or Application Logic Contracts (ALC).

15. The computer implemented method according to claim 1, further comprising providing a report to an appropriate authority summarizing the risk calculation and legal status of the transaction data and usage data.

16. The computer implemented method according to claim 1, further comprising a permissioned based Application Programming Interface to view the first set of data on the permissions based distributed ledger system.

17. The computer implemented method according to claim 16, wherein the permissioned based Application Programming Interface accesses at least one functionality on the permissions based distributed ledger system.

18. A system for identifying potential cost savings and making recommendations to achieve the cost savings, the system comprising:

control circuitry configured to perform a method comprising:

obtaining a first set of data from a permissions based distributed ledger system, the first set of data associated with a first event, wherein the distributed ledger system is enabled to execute transactions based on a smart contract;

obtaining sensor data associated with a first apparatus, the sensor data comprising biometric data associated with the first apparatus, location data associated with the first apparatus, and/or video data associated with the first apparatus, wherein the first apparatus further comprises providing a control chip designed to effect the operation of the first apparatus related to the first set of data and capable of communicating with the permissions based distributed ledger system;

applying a real-time first predictive analytics via a first machine learning algorithm to the obtained first set of data, the obtained biometric data, the obtained location data, and/or the obtained video data to predict contextual usage data to generate a first plurality of prediction inferences, wherein the first predictive analytics is trained on a first corpus of training data, wherein the first machine learning algorithm is enabled by a first Artificial Intelligence processing system, the first Artificial Intelligence processing system comprises an unsupervised Artificial Intelligence, the unsupervised artificial intelligence system being trained on at least one of interdisciplinary social sciences data, financial systems data, and/or historical data sets;

processing the contextual usage data predicted by the first predictive analytics on a second real-time predictive analytics-via a second machine learning algorithm to generate a second plurality of prediction inferences,; wherein the real-time second predictive analytics system is trained on a second corpus of training data, wherein the second machine learning algorithm is enabled by a second Artificial Intelligence processing system, the second Artificial Intelligence processing system comprises an unsupervised Artificial Intelligence, the unsupervised artificial intelligence system being trained on at least one of interdisciplinary social sciences data, financial systems data, and/or historical data sets;

automatically generating a risk status of the first set of data from the permissions based distributed ledger system by determining whether the obtained first set of data is associated with a plurality of risks by applying a thresholding technique to the contextual usage data and the first and/or the second plurality of prediction inferences;

automatically generating a legal status by comparing the generated risk status, the contextual usage data, and the first and/or the second plurality of prediction inferences with a legal predictive analytics system, wherein the legal predictive analytics system is trained on a third corpus of training data;

automatically executing a smart contract to enable preventative intervention on the permissions based distributed ledger system based on whether the first set of data was determined to be associated with a plurality of risks, wherein executing a smart contract may comprise freezing and/or reversing the transaction, and/or triggering protective measures to impede a predetermined behavior, wherein triggering protective measures may comprise a set of instructions; and sending a set of instructions to the control chip based on the calculation of the plurality of risks.

19. A non-transitory computer readable medium comprising instructions that, when executed by a processor, cause the processor to perform a method for identifying potential cost savings and making recommendations to achieve the cost savings the method comprising:

obtaining a first set of data from a permissions based distributed ledger system, the first set of data associated with a first event, wherein the distributed ledger system is enabled to execute transactions based on a smart contract;

obtaining sensor data associated with a first apparatus, the sensor data comprising biometric data associated with the first apparatus, location data associated with the first apparatus, and/or video data associated with the first apparatus, wherein the first apparatus further comprises providing a control chip designed to effect the operation of the first apparatus related to the first set of data and capable of communicating with the permissions based distributed ledger system;

applying a real-time first predictive analytics via a first machine learning algorithm to the obtained first set of data, the obtained biometric data, the obtained location data, and/or the obtained video data to predict contextual usage data to generate a first plurality of prediction inferences, wherein the first predictive analytics is trained on a first corpus of training data, wherein the first machine learning algorithm is enabled by a first Artificial Intelligence processing system, the first Artificial Intelligence processing system comprises an unsupervised Artificial Intelligence, the unsupervised artificial intelligence system being trained on at least one of interdisciplinary social sciences data, financial systems data, and/or historical data sets;

processing the contextual usage data predicted by the first predictive analytics on a second real-time predictive analytics-via a second machine learning algorithm to generate a second plurality of prediction inferences,; wherein the real-time second predictive analytics system is trained on a second corpus of training data, wherein the second machine learning algorithm is enabled by a second Artificial Intelligence processing system, the second Artificial Intelligence processing system comprises an unsupervised Artificial Intelligence, the unsupervised artificial intelligence system being trained on at least one of interdisciplinary social sciences data, financial systems data, and/or historical data sets;

automatically generating a risk status of the first set of data from the permissions based distributed ledger system by determining whether the obtained first set of data is associated with a plurality of risks by applying a thresholding technique to the contextual usage data and the first and/or the second plurality of prediction inferences;

automatically generating a legal status by comparing the generated risk status, the contextual usage data, and the first and/or the second plurality of prediction inferences with a legal predictive analytics system, wherein the legal predictive analytics system is trained on a third corpus of training data;

automatically executing a smart contract to enable preventative intervention on the permissions based distributed ledger system based on whether the first set of data was determined to be associated with a plurality of risks, wherein executing a smart contract may comprise freezing and/or reversing the transaction, and/or triggering protective measures to impede a predetermined behavior, wherein triggering protective measures may comprise a set of instructions; and sending a set of instructions to the control chip based on the calculation of the plurality of risks.

* * * * *